United States Patent [19]

Shenoy et al.

[11] Patent Number: 4,887,129

[45] Date of Patent: Dec. 12, 1989

[54] EDITING COPYING MACHINE

[76] Inventors: Vittal U. Shenoy, 26 Misty Pine Rd., Fairport, N.Y. 14450; Frank Y. Yang, 40 Woodlyn Way, Penfield, N.Y. 14526; James R. York, 1457 Loughton Dr., Webster, N.Y. 14580

[21] Appl. No.: 188,761

[22] Filed: May 2, 1988

Related U.S. Application Data

[63] Continuation of Ser. No. 861,891, May 12, 1986, abandoned.

[51] Int. Cl.⁴ .................. G03G 15/00; G03G 15/04
[52] U.S. Cl. .................................. 355/218; 355/202; 355/271; 355/40; 358/300; 340/705; 340/784; 340/793
[58] Field of Search ................ 355/14 R, 14 C, 7, 5, 355/218, 202, 271; 358/300, 302; 354/3, 5; 178/19; 382/59, 13, 57; 340/705, 784, 793

[56] References Cited

U.S. PATENT DOCUMENTS

| | | | |
|---|---|---|---|
| 3,904,822 | 9/1975 | Kamm et al. | 178/19 |
| 3,914,043 | 10/1975 | McVeigh | 355/4 |
| 4,088,842 | 5/1978 | Ikedo | 178/19 |
| 4,194,833 | 3/1980 | Lester et al. | 355/3 R |
| 4,297,022 | 10/1981 | Lester | 355/3 R |
| 4,322,157 | 3/1982 | Miura et al. | 355/14 |
| 4,340,295 | 7/1982 | Nakamura | 355/14 |
| 4,371,898 | 2/1983 | Nakamura | 358/300 |
| 4,394,877 | 7/1983 | Irie et al. | 355/14 |
| 4,417,805 | 11/1983 | Kishi | 358/300 |
| 4,475,239 | 10/1984 | Van Raamsdonk | 382/57 |
| 4,553,261 | 11/1985 | Froessl | 382/57 |
| 4,561,764 | 12/1985 | Sugiura | 355/8 |
| 4,582,417 | 4/1986 | Yagasaki et al. | 355/7 |
| 4,583,834 | 4/1986 | Seko et al. | 355/14 C |
| 4,588,282 | 5/1986 | Levine | 355/3 R |
| 4,640,601 | 2/1987 | Deguchi et al. | 355/7 |
| 4,653,899 | 3/1987 | Watanabe | 355/14 R |

FOREIGN PATENT DOCUMENTS

| | | | |
|---|---|---|---|
| 0087446 | 5/1984 | Japan | 355/75 |
| 0088754 | 5/1984 | Japan | 355/14 R |
| 0166969 | 8/1985 | Japan | 355/4 |

Primary Examiner—A. C. Prescott
Attorney, Agent, or Firm—Ronald Zibelli

[57] ABSTRACT

An apparatus in which an altered copy of an original document is produced. An editing device associated with an electrophotographic printing machine changes the information in the original document and generates a signal indicative of the changes therein. The information is stored in an erasable read-only memory. The erasable read-only memory is inserted into the copying machine to conrol the formation of the copies so as to correspond to the edited original document.

30 Claims, 6 Drawing Sheets

FIG. 3

Menu

| Clear Entry | Clear Page | Done |
| Information | Review | Enter |
| 1 | 2 | 3 |
| 4 | 5 | 6 |
| 7 | 8 | 9 |
| * Yes | 0 | # No |

28

Editing

| Erase | Backfill | Move |
| Color 1 | Color 2 | Black |
| Merge | Separation | End of Page |

Annotation

| Message # | Form # |

Standard

| Logo # | Pagination |

Custom

| Message | Forms | Logo |

Job Programming

Paper Supply

| 8.5 x 11" | 8.5 x 14" | 11 x 17" |

Reduction / Enlargement

| Variable | AutoFit |

Contrast

| Lighter | Darker |

2 Sided Copy

| 1 - 2 | 2 - 1 | 2 - 2 |

Copy Output

| Stapled | Uncollated | Collated |
| Photo Copy | Covers | Margin Shift |

EDITING COPYING MACHINE

This is a continuation of application Ser. No. 861,891, filed May 12, 1986, now abandoned.

This invention relates generally to an electrophotographic printing system and more particularly concerns an electrophotographic printing machine having associated therewith an information data editor.

Generally, an electrophotographic printing machine forms successive copies of an original document. Recent printing machines are also designed to reproduce an identical copy of the original document and an altered copy of the original document. Thus, the printing machine will erase unnecessary data on the original document and add new data thereto. In this way, the printing machine performs an information data editing function which significantly reduces the labor and time in preparing revised copies from an existing original document. In electrophotographic printing, a latent image is recorded on a photoconductive surface, developed, and the resultant powder image transferred to a copy sheet. The powder image is then fused to the copy sheet. The latent image of the original document is formed by scanning the original document and projecting a light image thereof onto the charged portion of the photoconductive surface so as to selectively discharge the charge thereon. The latent image is edited by superimposing thereover an electrically modulated beam, such as a modulated laser beam, or the like. The modulated laser beam adds additional information or erases information from the latent image. In this way, the resultant copy is altered from the original document. Various techniques have been devised for transmitting an electrical signal to modulate the laser so that the desired information recorded on the latent image. By way of example, the Panasonic E2S copier system uses an electronic pad to edit, move or delete information on a copy, and the Panasonic electronic print board allows information recorded on a blackboard sized electronic board to be copied automatically by a copying machine on a copy sheet. In order to define the area that is to be altered, the coordinates of the original document to be modified must be transmitted to the printing machine. Similarly, the NP 3525 Copier manufactured by the Canon Corporation employs an edit pad which enables selected portions of a copy to color, highlighted or deleted. Digitizers may be employed to define the coordinates of the original document to be altered. Exemplary digitizers are described in U.S. Pat. Nos. 4,088,842; 3,904,822; 4,080,515; 4,243,843; 4,368,351; and 4,368,352. Thus, it feasible to employ a digitizer to define the coordinates of the original document to be altered or where additional information is to be inserted into the copy. Various techniques have been devised for modifying copies of an original document. The following disclosures appear to be relevant: U.S. Pat. No. 3,914,043; Patentee: McVeigh; Issued: Oct. 21, 1975. U.S. Pat. No. 4,322,157; Patentee: Miura et al.; Issued: Mar. 30, 1982. U.S. Pat. No. 4,340,295; Patentee: Nakamura; Issued: July 20, 1982. U.S. Pat. No. 4,371,898; Patentee: Nakamura; Issued: Feb. 1, 1983. U.S. Pat. No. 4,394,087; Patentee: Irie et al.; Issued: July 19, 1983. U.S. Pat. No. 4,475,239; Patentee: van Raamsdonk; Issued: Oct. 2, 1984. U.S. Pat. No. 4,553,261; Patentee: Froessl; Issued: Nov. 12, 1985.

The disclosures of the above-identified art may briefly summarized as follows:

McVeigh describes a selector which enables selected portions of a copy to be reproduced in one color with the remaining potions thereof being reproduced in another color.

Miura et al. discloses a copying machine wherein a predetermined part of the image data of an original document is extracted and temporarily stored in a first memory unit for subsequent editing. This data for forming the copy from the original is stored in a second memory unit. The data read from the memory units and new data inputted by a data generator are combined selectively to form a copy.

Nakamura ('295) discloses a recording device wherein an original document is positioned on a copy board. Movable slides are positioned along the sides of the original document and transmit an electrical signal indicative of the region of the original document to be masked. During the formation of the electrostatic latent image, the selected region is masked and an optical image of the desired new information if projected onto the masked region so as to record a composite electrostatic latent image which is subsequently developed, transferred, and fused to form a copy which is modified from the original document.

Nakamura ('898) describes a keyboard and a display screen which may be used to modify an original document being reproduced. External information signals representing characters are loaded by manipulating keys or buttons of the keyboard by an operator. The input information is then displayed on a display screen. The screen also indicates where information from the original document is to be positioned. The resultant electrical signal is transmitted to the printing machine for masking the appropriate portions of the original document and inserting the new data from the input device. In this way, the copies include a portion of the information from the original document and the desired information from the input device.

Irie et al. discloses an operator control panel on a copier for regulating the copier and displaying the status of the copier.

Van Raamsdonk describes an apparatus for text editing and processing having a writing device, an operating console and a data storage device with a removable data carrier. An input pen is connected to the apparatus.

Froessl discloses a document and data handling and retrieval system including a reader and digitizer for producing and storing fragmented or digitized images. A printing device may be arranged to print on any normally unused portion of a document so as to not interfere with the text appearing thereon.

In accordance with one aspect of the present invention, there is provided an apparatus for producing an altered copy of the original document. Means reproduce copies of an original document. Means, located remotely from the reproducing means, change the information of the original document and generate a signal indicative of the changes in the original document. Means, mounted removably on the changing means, store the signals indicative of the changes in the original document. The storing means is adapted to be mounted removably on the reproducing means to transmit the changes in the original document to the reproducing means so that the copy being reproduced is altered in accordance with the change in information on the original document.

Pursuant to another aspect of the present invention, there is provided a copying system for reproducing a substantially identical or altered copy of an original document. An electrographic printing machine is adapted to reproduce identical or altered copies of an original document. Operator selectable means change the information of the original document and generate a signal indicative of the changes in the original document. Means, mounted removably on the changing means, store the signals indicative of the changes in the original document. The storing means is adapted to be mounted removably on the electrophotographic printing machine to transmit the changes in the original document to the electrophotographic printing machine so that the copy being reproduced is altered in accordance with the change in information on the original document.

Other aspects of the present invention will become apparent as the following description proceeds and upon reference to the drawings, in which:

FIG. 3 shows the overlay view of the FIG. 2 edit pad;

While the present invention will hereinafter be described in connection with a preferred embodiment thereof, it will be understood that it is not intended to limit the invention to that embodiment. On the contrary, it is intended cover all alternatives, modifications and equivalents as may be included within the spirit and scope of the invention as defined by the appended claims.

Figure 1:
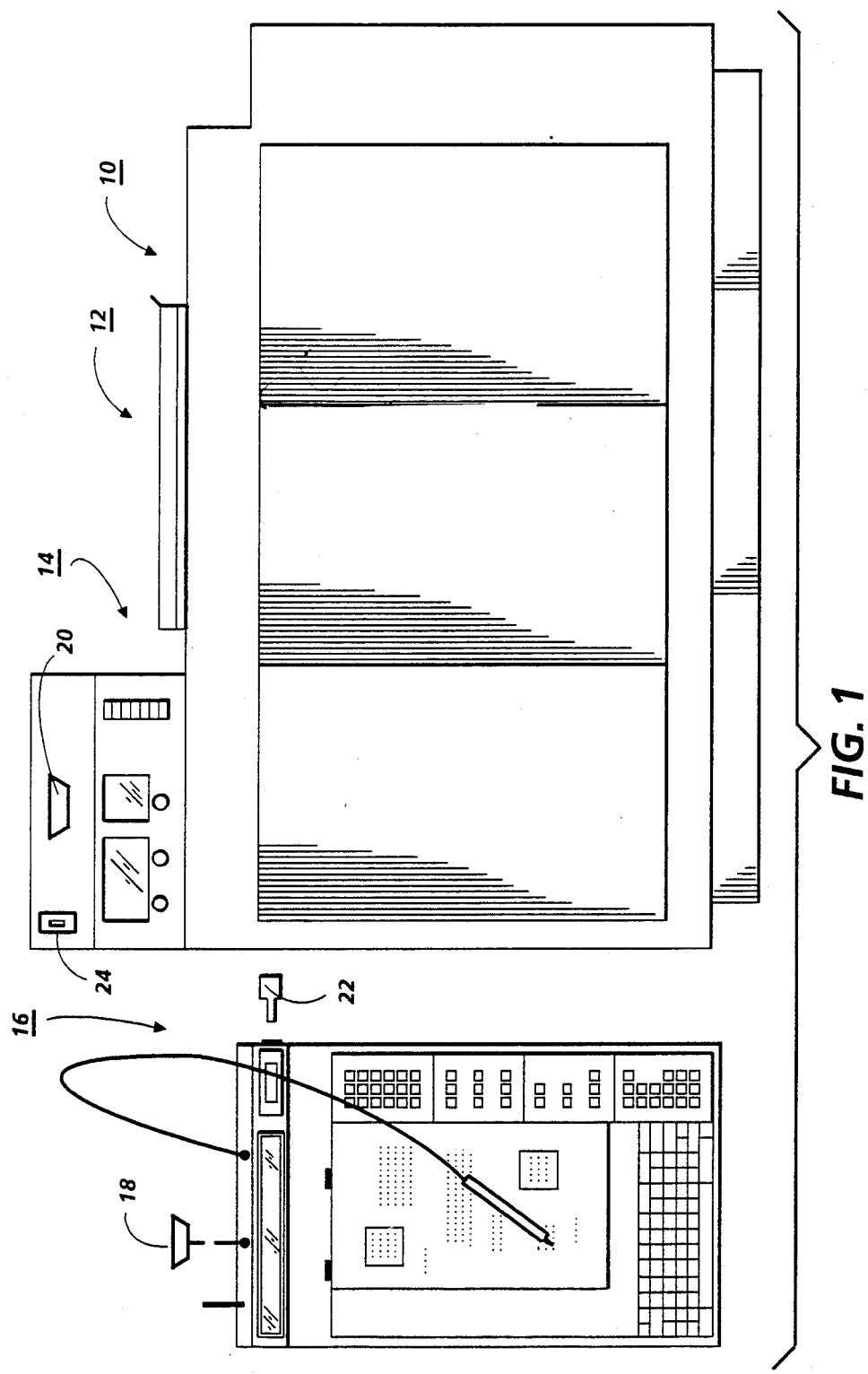
FIG. 1 is a schematic elevational view depicting an illustrative electrophotographic printing machine having the edit pad of the present invention associated therewith.

For general understanding of the features of the present invention, reference is made to the drawings. In the drawings, like reference numerals have been used throughout to designate identical elements. FIG. 1 schematically depicts the printing system comprising an electrophotographic printing machine for reproducing copies and an edit pad for altering the copies without effecting the original document. It will become evident from the following discussions that the edit pad of the present invention is equally well suited for use in a wide variety of printing systems or other types of devices where it is desired to alter the copy without effecting the original document. The features of the present invention are not specifically limited in their application to the particular embodiment depicted herein.

Referring now to FIG. 1 of the drawings, the printing system and its operation will be described with reference thereto. Inasmuch as the art of electrophotographic printing is well known, the operation of the printing machine will be described briefly.

The electrophotographic printing machine, generally designated by the reference numeral 10, is capable of producing a stream of copy sheets having information copied on one side only, simplex sheets or on both sides, duplex sheets. A recirculating document feeder 12 is shown positioned above a platen (not shown) at the imaging station of printing machine 10. Document feeder 12 is adapted to feed original documents, in seriatim, to the platen for copying. Document feeder 12 usually operates in a collating mode in which original documents are fed, in seriatim, from a stack in a tray at the top of the feeder to the platen for copying one at a time for each circulation and then returned to the stack. The original documents are placed in the feeder in a predetermined, page sequential order. For example, the first page is on top of the stack and the last page is at the bottom of the stack. The last original document is fed to the platen first and then returned to the top of the stack. The machine operator can control the operation of the printing machine and its related apparatus through the operator control panel, designated generally by the reference numeral 14, and the edit pad, designated generally by the reference numeral 16. If desired, the recirculating document handling unit may be pivoted in an upward direction while the machine operator manually places an original document on the platen of the printing machine. In this mode of operation, the recirculating handler is inoperative. Edit pad 16 is connected to the electrophotographic printing machine by an RS232 connector 18 which plugs into adapter 20 on control panel 14 of printing machine 10. If the edit pad is positioned remotely from printing machine 10, the changes in the copy are stored in a portable memory key 22 which is initially positioned in edit pad 16 to store the requisite changes. Thereafter, memory key 22 is inserted into the receptacle 24 in control panel 14 of printing machine 10 so as to control the printing machine to adjust the alterations in the copy, as required.

In general, electrophotographic printing machines generally include a belt having a photoconductive surface deposited on a conductive substrate. The belt advances successive portions of the photoconductive surface to various processing stations disposed about the path of movement thereof. Initially, a portion of the belt passes through a charging station. At the charging station, a corona generating device charges the photoconductive surface of the belt to a relatively high, substantially uniform potential. Thereafter, the charged portion of the photoconductive surface is advanced through the imaging station. At the imaging station, a scan lamp, lens and mirrors move across the original document illuminating successive incremental portions thereof. The light rays reflect from the original document are transmitted through the lens forming a light image thereof. These light rays are focused onto the charged portion of the photoconductive surface to selectively dissipate the charge thereon. This records an electrostatic latent image on the photoconductive surface which corresponds to the informational areas contained within the original document disposed upon the platen. If it is desired to erase selected portions of the original document or to add additional material thereto, a write system is actuated. A write system can either be a laser imaging system of an LED or LCD image bar When the laser system is used, it generates a modulated laser beam for selectively irradiating charged portions of the photoconductive surface to add additional information to the copy or to delete information therefrom. If it is desired to move information on the original document, the lens is automatically moved from its initial positional coordinates to the desired new positional coordinates as the optical system scans across the original document. In this way, information on the original document may be translated to new coordinates on the copy sheet. After the electrostatic latent image is recorded on the photoconductive surface, the belt advances it through a development station. At the development station, a magnetic brush development system transports a developer mixture of carrier granules and toner particles into contact with the electrostatic latent image recorded on the photoconductive surface. The toner particles are attracted from the carrier granules to the electrostatic latent image forming a toner powder image on the photoconductive surface of the belt. The development system includes at least two developer units. One of the developer units has black toner particles therein while the other developer unit includes toner particles of a selected color. In this way, the resultant copy may be reproduced in a desired color other than black or have portions thereof color highlighted. In either case, the toner particles are attracted from the carrier granules to the latent image forming a toner powder image on the photoconductive surface. After development, the belt advances the toner powder image to a transfer station. At the transfer station, a copy sheet is moved in contact with the toner powder image. A corona generating device sprays ions onto the backside of the copy sheet. This attracts the toner powder image from the photoconductive surface to the copy sheet. After transfer, the copy sheet moves to the fusing station. The fusing station includes a fuser assembly which permanently affixes the transferred toner powder image to the copy sheet. By way of example, the fuser assembly includes a heated fuser roll and back-up roll. The copy sheet passes between the fuser roll and back-up roll with the toner powder contacting the fuser roll. In this manner, the toner powder image is permanently affixed to the copy sheet. After fusing, a conveyor belt guides the advancing sheet to the catch tray for subsequent removal from the printing machine by the operator. Alternatively, the advancing sheet may be guided to a finishing station wherein a plurality of sets may be formed with the copy sheets being either stapled or bound to one another.

Edit pad 16 is designed to control the alterations to be made on the copy sheet. If the edit pad is located remotely from the printing machine, the altered information is stored in memory key 22. Alternatively, if the edit pad 16 is connected by connector 18, i.e. an RS232 connector, to the printing machine, the altered information is transmitted directly to the printing machine so as to immediately modify copies being reproduced thereby. It is believed that the foregoing description is sufficient for purposes of the present application to describe the general operation of the printing system incorporating the features of the present invention therein.

Figure 2:
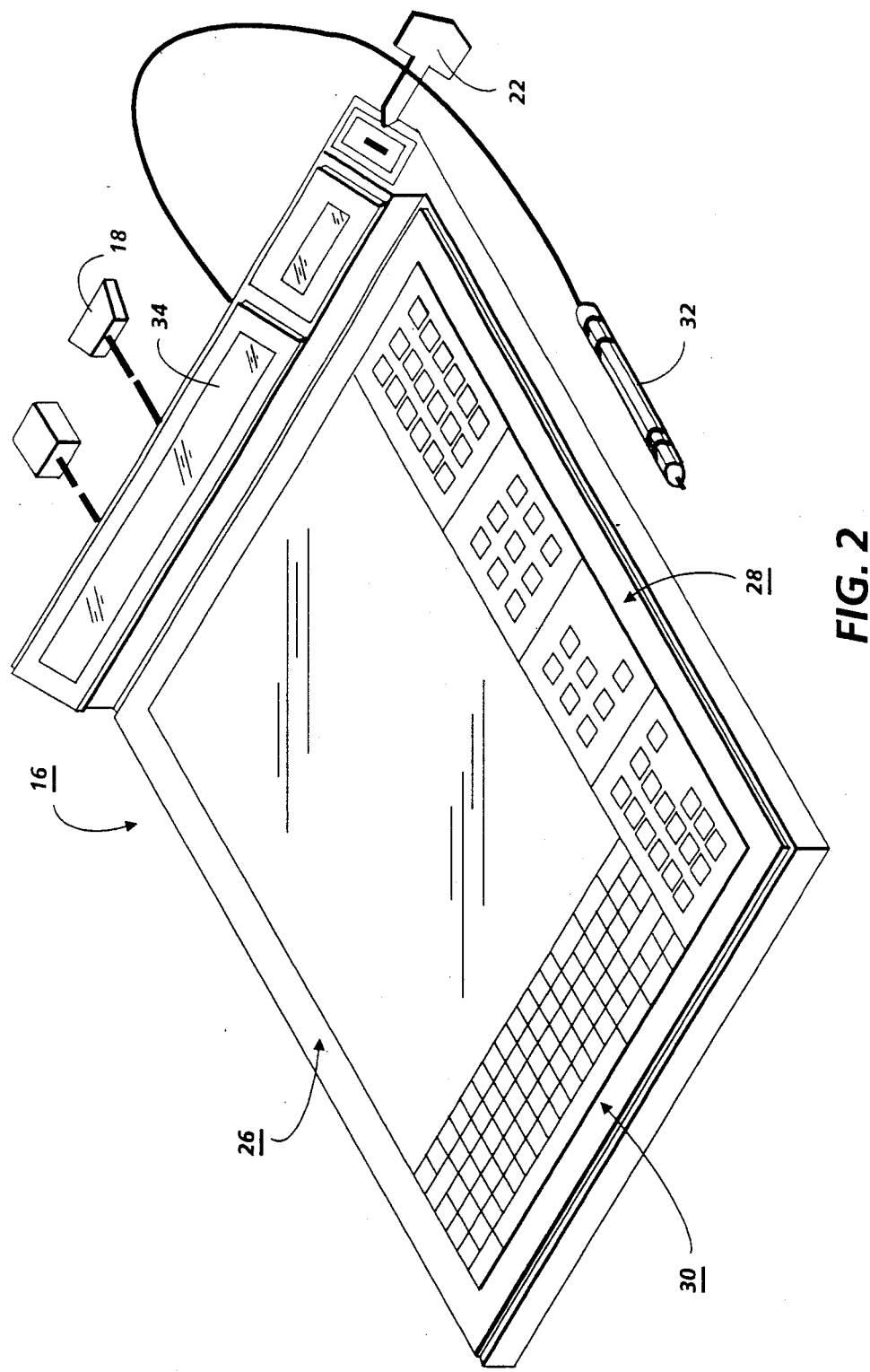
FIG. 2 is a perspective view of the FIG. 1 edit pad.

Referring now to FIG. 2, there is shown the detailed structure of edit pad 16. Edit pad 16 includes a digitizing area indicating generally by the reference numeral 26, an adjacent menu selection area, indicated generally by the reference numeral 28, and a keyboard area, indicated generally by the reference numeral 30. The original document is positioned in the digitizing area and the coordinates of the original document desired to be altered are identified by positioning stylus 32 in contact therewith, In this way, positional coordinate information is transmitted either directly to the printing machine through the RS232 channel, indicated by the reference numeral 18, or to memory key 22. In either case, any suitable digitizer may be employed. Suitable digitizing schemes are disclosed in U.S. Pat. Nos. 4,368,351; 4,368,352; and 4,243,843, the relevant portions thereof are hereby being incorporated into the present application. Menu selection area 28 includes a plurality of editing, and job programming features which may be actuated by locating the stylus 32 in contact with the selected block. Positioning the stylus 32 in contact with the selected block in menu selection area 28 defines the operation to be performed on the selected text within the original document. Alternatively, additional text may be furnished to the original document by selecting the appropriate block in the menu selection area and typing the desired information by selecting the keys of keyboard area 30 with stylus 32. One skilled in the art will appreciate that a conventional typing keyboard may be employed in lieu of a keyboard area actuated by stylus 32. The information being added to the copy of the original document is displayed on display 34 which is a forty character, two line, liquid crystal display (LCD) for the exclusion of illustrating the input data being added to the copy of the original document. The LCD display is also programmed to provide step by step instructions for using the edit pad. Other suitable displays are cathode ray tubes (CRT). Memory key 22 is erasable programmable, read only memory. By way of example, a 16K bit chip may be used to store the information to be used to program the operations of a remotely located printing machine.

Turning now to FIG. 3, there is shown the detailed structure of overlay menu area 28. As shown thereat, each block defines a specific operation to be performed on the copy. Each block is located in a discrete positional coordinate on the digitizing area. In this way, actuation of a specific block by stylus 32 defines specific positional coordinates which actuate the logic control to perform specific operations within the printing machine. By way of example, if it is desired to erase selected information from the copy sheet, the stylus is positioned in contact with the erase block of overlay menu 28. The digitizing area transmits a signal indicative of the erase positional coordinates. The information desired to be erased is selected and the positional coordinates thereof are also identified by the digitizing area. The digitizing area transmits a signal defining the positional coordinates of the information desired to be deleted from the copy and the operation to be performed on the copy, i.e. erase the information. The erase signal actuates a light emitting diode array (LED) or the laser beam which is modulated to erase the selected portions of the original document from the copy sheet. This is achieved by illuminating selected portions of the electrostatic latent image after the latent image of the original document is recorded on the photoconductive surface. This deletes the desired information therefrom. If it were desired to move a selected block of text in the copy, the stylus would be positioned over the move block in overlay menu 28. This generates a signal to the control circuitry which moves the lens to the new positional coordinates during the scan operation of the original document. In this way, the light image of the selected portion of the original document is shifted so as to shift a selected portion of the electrostatic latent image recorded on the photoconductive surface. In this way, the selected information on the original document is moved on the copy sheet to the new positional coordinates. Movement of the lens determines the inboard and outboard position of the information. In the process direction, latent image placement is delayed relevant to the position of the copy sheet. It is thus clear that by selecting various blocks on the overlay menu 28, the corresponding digitizing area positional coordinates transmit a signal which actuates the respective operations within the printing machine to effect the desired change on the copy sheet.

Figure 4:
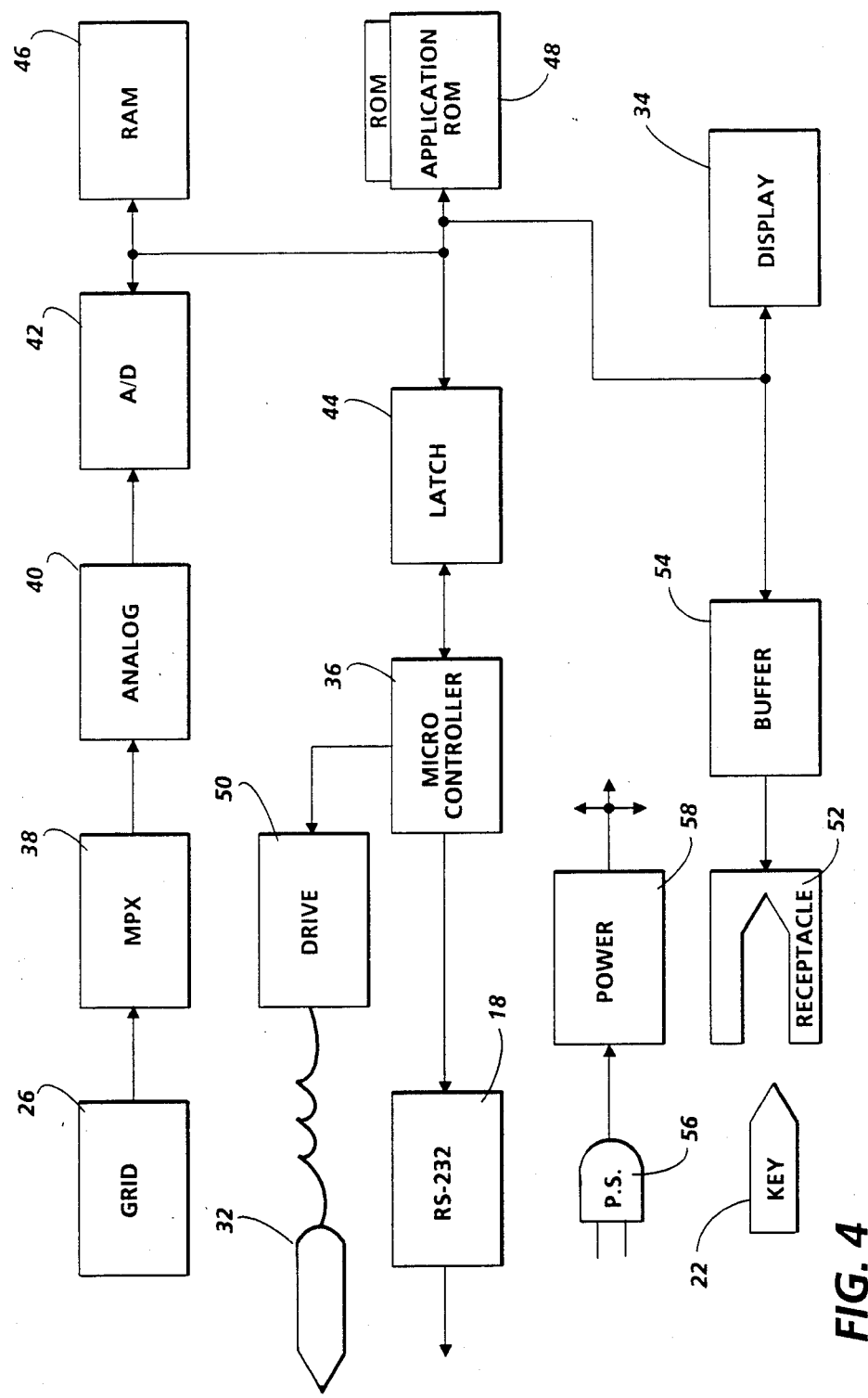
FIG. 4 is block diagram of the FIG. 2 edit pad.

Turning now to FIG. 4, there is shown a block diagram of the electronics package being employed. An Intel 8051/8031 microcontroller chip 36 forms the basic electronics control package. Microcontroller chip 36 receives information from digitizing area 26. This information is transmitted through a multiplexing circuit 38, an analog circuit 40, and an analog to digital circuit 42 and a latching circuit 44. The output from the analog to digital converter is also transmitted to a random access memory chip 46. Software to interpret the coordinates and run the digitizer reside in read only memory chip 48. The digitizing area 26 output is also connected to display 34. Microcontroller 36 controls drive circuit 50 which is coupled to stylus 32. Memory key 22 is received in receptacle 52 which is connected to display 34 and microcontroller 36 via buffer 54. Power supply 56 connects power supply 58 to an external power source. Microcontroller 36 obtains positional data from the digitizing areas, formats the data for transmission, and places the data into the memory key 22 or transmits the data by the RS232 channel 18 to printing machine 10. It is also controls the data bus line and several peripherals, i.e. display 34, analog to digital converter 42, non-volatile memory key receptacle 52, programmable read only memory 48, and random access memory 46. Analog to digital converter 42 connects analog circuit 40 supporting the digitizing area 26 and provides raw digital positional information to microcontroller 36. Key receptacle 52 forms a physical socket for the non-volatile memory key 22 and connects it electrically to the controller bus line. There is no need for buffer 54 located between the data bus line and the key receptacle if the edit pad is non-operative when the key is removed. However, if the edit pad operates with or without the key, line buffering is required and buffer 54 is necessary. External application read only memory 48 and random access memory 46 each preferably have 4K of memory.

Figure 5:
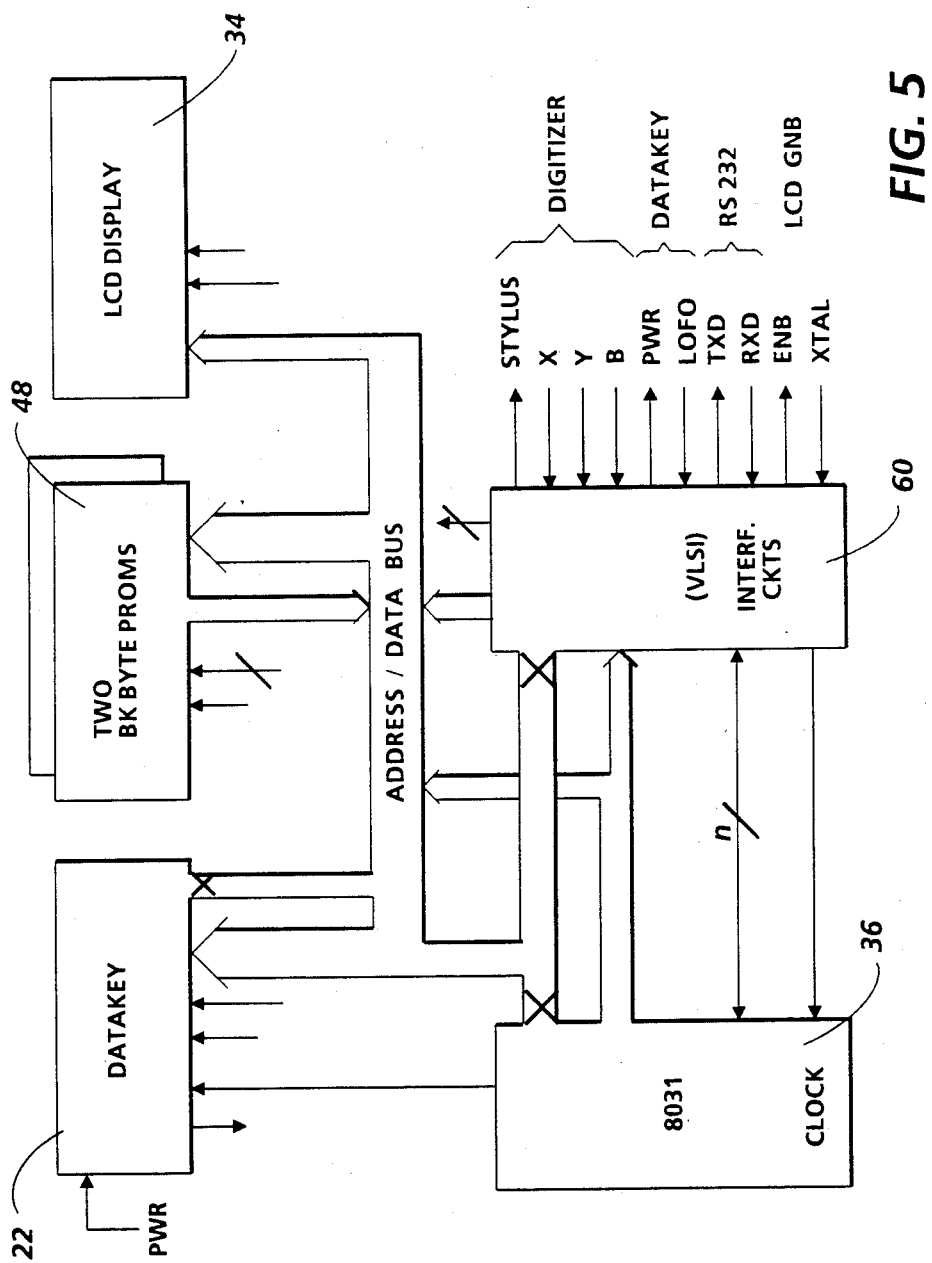
FIG. 5 is a logic diagram illustrating the logic circuitry employed in the FIG. 3 edit pad.

Referring now to FIG. 5, there is shown another block diagram of edit pad 16. As shown thereat, data key 22, read only memory 48, and display 34 are connected to microcontroller 36, which, in turn, is connected to interface logic circuit 60 which controls printing machine 10. By way of example, interface circuit 60 may be a VLSI chip. The logic diagram for interface circuit 60 is shown in FIG. 6.

Figure 6:
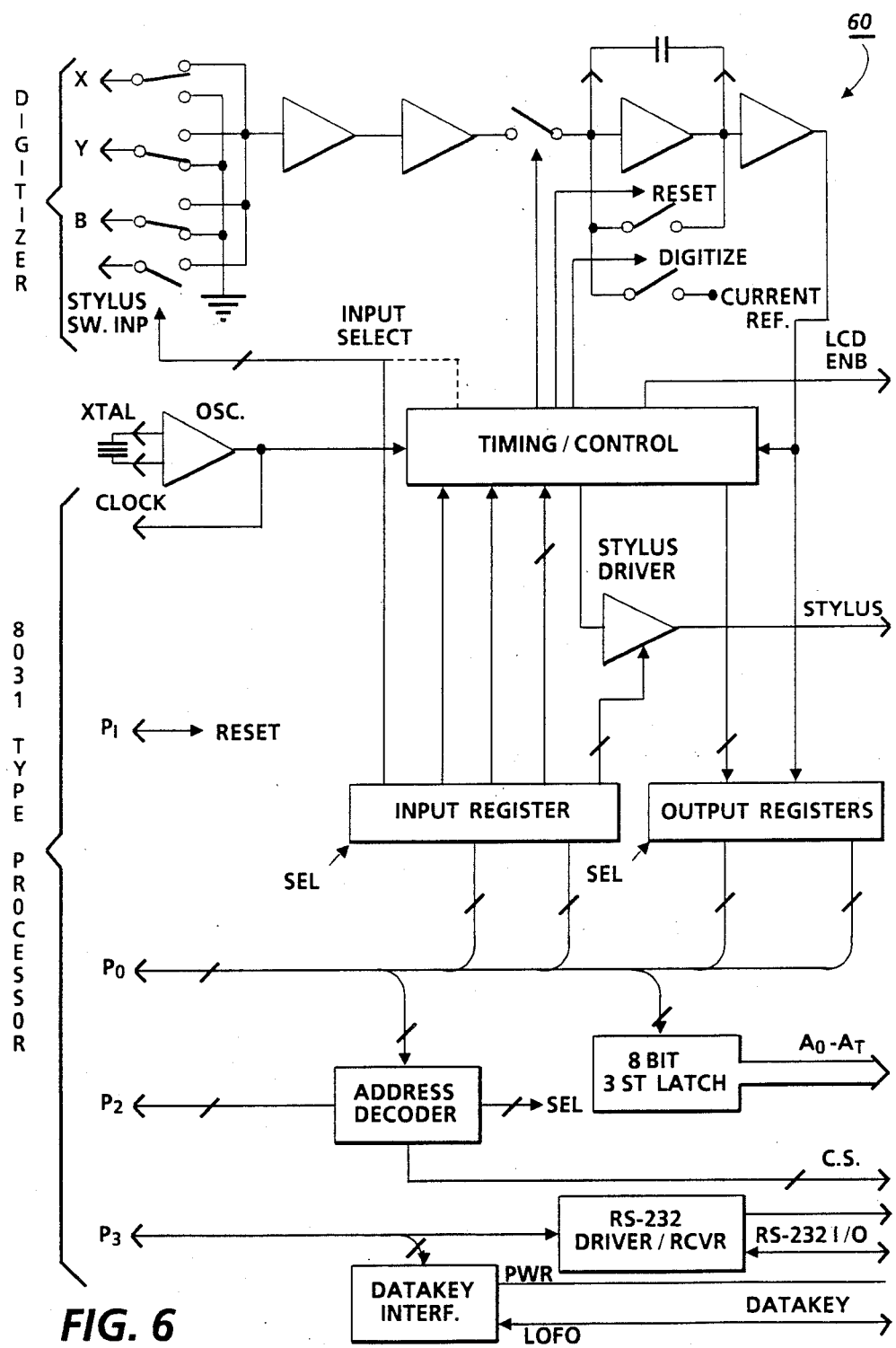
FIG. 6 is a logic diagram of the FIG. 5 VLSI circuitry.

As shown in FIG. 6, interface logic circuit 60 is connected to the digitizing area 26 and microcontroller 36. It is also connected to memory key 22, RS232, connector 18 and liquid crystal display 34. One skilled in the art will appreciated that interface circuit 60 is one embodiment and there may be many alternatives and variations which achieve the same functions. Interface circuit 60 is designed to generate the requisite signals to control the printing machine so that the information reproduced on the copy sheet contains the desired alterations from the original document.

In recapitulation, it is clear that the edit pad of the present invention either stores the information necessary for altering the copy sheet from the original document or transmits this information directly to the printing machine so as to make the alterations in the copy sheet immediately. The edit pad includes a digitizing area to define the positional coordinates to be changed, and an overlay menu which may be readily actuated by the operator to effect the desired changes in the copy. In this way, an altered copy of an original document may be readily reproduced by an electrophotographic printing machine.

It is, therefore, evident that there has been provided in accordance with the present invention, a printing system which fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. An apparatus for producing an altered copy of an original document, including:
    means for reproducing copies of an original document;
    means, located remotely from said reproducing means and having the original document positioned removably thereon, for changing the information of the original document and generating a signal indicative of the changes in the original document; and
    means, mounted removably on said changing means, for storing the signals indicative of the changes in the original document, said storing means being adapted to be mounted removably on said reproducing means to transmit the changes in the original document to said reproducing means so that when the original document is removed from said changing means and positioned on said reproducing means the copy being reproduced is altered in accordance with the change in information stored in said storing means.

2. An apparatus according to claim 1, further including operator connectable means for connecting said changing means to said reproducing means to transmit the changes in the original document to said reproducing means so that the copy being reproduced is altered in accordance with the change in information on the original document.

3. An apparatus according to claim 2, wherein said changing means includes:
    a digitizing area adapted to have the original document positioned thereon; and
    an operator movable stylus operatively associated with said digitizing area to energize operator selected regions of said digitizing area to generate a signal defining the positional coordinates of the original document to be altered.

4. An apparatus according to claim 3, wherein said changing means includes operator actuatable command input means for entering commands defining the operation to be performed on the original document to effect the alteration therein.

5. An apparatus according to claim 4, wherein said command input means includes a display of commands that are operator selectable to generate a signal defining the operation to be performed on the original document to effect the alteration therein.

6. An apparatus according to claim 5, wherein said storing means includes an electrically erasable, programmable read only memory.

7. An apparatus according to claim 6, wherein said data generator means includes a keyboard display.

8. An apparatus according to claim 7, wherein selected keys of said keyboard display are actuatable by said stylus to generate a signal corresponding to the new information being added to the copy.

9. An apparatus according to claim 8, wherein said reproducing means includes an electrophotographic printing machine.

10. A copying system for reproducing a substantially identical or altered copy of an original document, including:
   an electrophotographic printing machine adapted to reproduce identical or altered copies of an original document;
   operator selectable means, located remotely from said electrophotographic printing machine and being adapted to have the original document positioned thereon, for changing the information of the original document and generating a signal indicative of the changes in the original document; and
   means, mounted removably on said changing means, for storing the signals indicative of the changes in the original document, said storing means being adapted to be mounted removably on said electrophotographic printing machine to transmit the changes in the original document to said electrophotographic printing machine so that when the original document is positioned on said electrophotographic printing machine the copy being reproduced is altered in accordance with the change in information stored in said storing means.

11. A copying system according to claim 10, further including operator connectable means for connecting said changing means to said electrophotographic printing machine to transmit the changes in the original document to said electrophotographic printing machine so that the copy being reproduced is altered in accordance with the change in information on the original document.

12. A copying system according to claim 11, wherein said changing means includes:
   a digitizing area adapted to have the original document positioned thereon; and
   an operator movable stylus operatively associated with said digitizing area to energize operator selected regions of said digitizing area to generate a signal defining the positional coordinates of the original document to be altered.

13. A copying system according to claim 12, wherein said changing means includes operator actuatable command input means for entering commands defining the operation to be performed on the original document to effect the alteration therein.

14. A copying system according to claim 13, wherein said command input means includes a display of commands that are operator selectable to generate a signal defining the operation to be performed on the original document to effect the alteration therein.

15. A copying system according to claim 14, wherein said storing means includes an electrically erasable, programmable read only memory.

16. A copying system according to claim 15, wherein said data generator means include a keyboard display.

17. A copying system according to claim 16, wherein selected keys of said keyboard display are actuatable by said stylus to generate a signal corresponding to the new information being added to the copy.

18. A copy system, comprising:
   input means for inputting an editing condition for image editing;
   a storage medium attachably/detachably attached to said input means and for storing the inputted editing condition;
   a copying machine;
   a storage medium receiving portion formed on said copying machine, to which said storage medium being attachably/detachably attached; and
   image forming means installed in said copying machine and for forming a copy image of an original being edited in accordance with the editing condition from said storage medium attached to said receiving portion.

19. A copy system in accordance with claim 18, wherein said storage medium includes a readable/writable memory.

20. A copy system in accordance with claim 18, wherein said input means includes:
   a tablet on which the original is placed; and
   an input pen for designating a position to be edited on the original by contacting said tablet.

21. A copy system in accordance with claim 18, wherein:
   said input means includes editing function designating means for selectively designating one of a plurality of editing functions, the designated editing function being stored in said storage medium; and
   said image forming means includes means for editing an image in accordance with said editing function given from said storage medium.

22. A copy system in accordance with claim 18, wherein said input means includes means for adding information to the original.

23. A copy system in accordance with claim 22, further including means for displaying the information being added to the original.

24. A copy system, comprising:
   input means for inputting an editing condition for image editing a control condition for controlling a copying process;
   a storage medium attachably/detachably attached to said input means and for storing the inputted editing condition and the control condition;
   a copying machine;
   a storage medium receiving portion formed on said copying machine, to which said storage medium being attachably/detachably attached; and
   image forming means installed in said copying machine and for forming a copy image of an original being edited in accordance with the editing condition from said storage medium attached to said receiving portion as a function of said control condition.

25. A copy system in accordance with claim 24, wherein said storage medium includes a readable/writable memory.

26. A copy system in accordance with claim 24, wherein said input means includes:
   a tablet on which the original is placed; and
   an input pen for designating a position to be edited on the original and for designating the control condition by contacting said tablet.

27. A copy system in accordance with claim 24, wherein:
   said input means includes editing function designating means for selectively designating one of a plurality of editing functions, the designated editing function being stored in said storage medium; and said image forming means includes means for editing an image in accordance with said editing function given from said storage medium.

28. A copy system in accordance with claim 24, wherein said input means includes means for adding information to the original.

29. A copy system in accordance with claim 28, further including displaying means for displaying the information being added to the original.

30. A copy system in accordance with claim 24, wherein:
said input means includes control condition designating means for selectively designating one of a plurality of control conditions, the designated control condition being stored in said storage medium: and
said image forming means includes means for copying in accordance with said control condition given from said storage medium.

* * * * *